US010419971B2

(12) United States Patent
Vermani et al.

(10) Patent No.: US 10,419,971 B2
(45) Date of Patent: Sep. 17, 2019

(54) ROBUST EARLY DETECTION THROUGH SIGNAL REPETITION IN MIXED-RATE WIRELESS COMMUNICATIONS

(71) Applicant: QUALCOMM Incorporated, San Diego, CA (US)

(72) Inventors: Sameer Vermani, San Diego, CA (US); Bin Tian, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/013,959

(22) Filed: Feb. 2, 2016

(65) Prior Publication Data
US 2016/0227436 A1 Aug. 4, 2016

Related U.S. Application Data

(60) Provisional application No. 62/112,048, filed on Feb. 4, 2015.

(51) Int. Cl.
| | | |
|---|---|---|
| H04W 28/06 | (2009.01) | |
| H04L 29/06 | (2006.01) | |
| H04L 1/08 | (2006.01) | |
| H04L 1/00 | (2006.01) | |

(52) U.S. Cl.
CPC ............... *H04W 28/06* (2013.01); *H04L 1/08* (2013.01); *H04L 69/22* (2013.01); *H04L 2001/0093* (2013.01)

(58) Field of Classification Search
CPC .......... H04W 28/06; H04L 1/08; H04L 69/22; H04L 2001/0093
See application file for complete search history.

(56) References Cited

U.S. PATENT DOCUMENTS

| | | | |
|---|---|---|---|
| 2011/0013547 A1* | 1/2011 | Liao | H04B 7/0671 370/310 |
| 2011/0051706 A1 | 3/2011 | Schmidl et al. | |
| 2012/0263107 A1 | 10/2012 | Taghavi et al. | |
| 2014/0029681 A1* | 1/2014 | Zhang | H04L 1/0046 375/260 |
| 2014/0146923 A1* | 5/2014 | Paker | H04L 27/0008 375/329 |
| 2015/0009894 A1 | 1/2015 | Vermani et al. | |
| 2016/0127948 A1* | 5/2016 | Azizi | H04L 27/2613 370/338 |
| 2016/0127992 A1* | 5/2016 | Kenney | H04W 52/0212 370/311 |
| 2016/0212247 A1* | 7/2016 | Azizi | H04L 27/2613 |
| 2016/0227537 A1* | 8/2016 | Li | H04L 27/20 |
| 2017/0208153 A1* | 7/2017 | Li | H04L 1/00 |

OTHER PUBLICATIONS

International Search Report and Written Opinion—PCT/US2016/016381—ISA/EPO—dated Jun. 1, 2016.

\* cited by examiner

*Primary Examiner* — Habte Mered
(74) *Attorney, Agent, or Firm* — Paradice and Li LLP/Qualcomm

(57) ABSTRACT

A method of wirelessly communicating includes generating, at a wireless device, a packet including a first preamble field. The method further includes generating a first repeated preamble field by multiplying the first preamble field by a first frequency-domain polarity sequence. The method further includes transmitting the packet from the wireless device. The packet includes the first preamble field and the first repeated preamble field.

18 Claims, 10 Drawing Sheets

ROBUST EARLY DETECTION THROUGH SIGNAL REPETITION IN MIXED-RATE WIRELESS COMMUNICATIONS

PRIORITY CLAIM

This application claims the benefit of U.S. Provisional Application No. 62/112,048, filed Feb. 4, 2015, which is hereby incorporated herein by reference in its entirety.

FIELD

Certain aspects of the present disclosure generally relate to wireless communications, and more particularly, to methods and apparatuses for detection of communications in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

As the volume and complexity of information communicated wirelessly between multiple devices continues to increase, overhead bandwidth required for physical layer control signals continues to increase at least linearly. The number of bits utilized to convey physical layer control information has become a significant portion of required overhead. Thus, with limited communication resources, it is desirable to reduce the number of bits required to convey this physical layer control information, especially as multiple types of traffic are concurrently sent from an access point to multiple terminals. At the same time, it is desirable to improve reliability of signal detection. Thus, there is a need for an improved protocol for mixed-rate transmissions.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages can become apparent from the description, the drawings, and the claims. Note that the relative dimensions of the following figures may not be drawn to scale.

One aspect of the present disclosure provides a method of wireless communication. The method includes generating, at a wireless device, a packet including a first preamble field. The method further includes generating a first repeated preamble field by multiplying the first preamble field by a first frequency-domain polarity sequence. The method further includes transmitting the packet from the wireless device. The packet includes the first preamble field and the first repeated preamble field.

In various embodiments, the first preamble field can be decodable by a plurality of devices, and the packet can include a second preamble field decodable by only a subset of the plurality of devices. In various embodiments, the first frequency-domain polarity sequence can include a predetermined sequence of −1 or +1. In various embodiments, the first preamble field can include a length indication that is not a multiple of 3.

In various embodiments, the method can further include generating a second repeated preamble field by multiplying a second preamble field by a second frequency-domain polarity sequence. The packet can include the other repeated preamble field. In various embodiments, the first preamble field can include a legacy signal (L-SIG) field, the legacy preamble being decodable by a plurality of devices, and the first repeated preamble field can include a repeated legacy signal (RL-SIG) field.

Another aspect provides an apparatus configured to perform wireless communication. The apparatus includes a processor configured to generate a packet including a first preamble field. The processor is further configured to generate a first repeated preamble field by multiplying the first preamble field by a first frequency-domain polarity sequence. The apparatus further includes a transmitter configured to transmit the packet from the apparatus. The packet includes the first preamble field and the first repeated preamble field.

In various embodiments, the first preamble field can be decodable by a plurality of devices, and the packet can include a second preamble field decodable by only a subset of the plurality of devices. In various embodiments, the first frequency-domain polarity sequence can include a predetermined sequence of −1 or +1. In various embodiments, the first preamble field can include a length indication that is not a multiple of 3.

In various embodiments, the processor is further configured to generate a second repeated preamble field by multiplying a second preamble field by a second frequency-domain polarity sequence. The packet can include the other repeated preamble field. In various embodiments, the first preamble field can include a legacy signal (L-SIG) field, the legacy preamble being decodable by a plurality of devices, and the first repeated preamble field can include a repeated legacy signal (RL-SIG) field.

Another aspect provides another apparatus for wireless communication. The apparatus includes means for generating a packet including a first preamble field. The apparatus further includes means for generating a first repeated preamble field by multiplying the first preamble field by a first frequency-domain polarity sequence. The apparatus further includes means for transmitting the packet from the apparatus. The packet includes the first preamble field and the first repeated preamble field.

In various embodiments, the first preamble field can be decodable by a plurality of devices, and the packet can include a second preamble field decodable by only a subset of the plurality of devices. In various embodiments, the first frequency-domain polarity sequence can include a predetermined sequence of −1 or +1. In various embodiments, the first preamble field can include a length indication that is not a multiple of 3.

In various embodiments, the apparatus can further include means for generating a second repeated preamble field by multiplying a second preamble field by a second frequency-domain polarity sequence. The packet can include the other repeated preamble field. In various embodiments, the first preamble field can include a legacy signal (L-SIG) field, the legacy preamble being decodable by a plurality of devices, and the first repeated preamble field can include a repeated legacy signal (RL-SIG) field.

Another aspect provides a non-transitory computer-readable medium. The medium includes code that, when executed, causes an apparatus to generate a packet including a first preamble field. The medium further includes code that, when executed, causes the apparatus to generate a first repeated preamble field by multiplying the first preamble field by a first frequency-domain polarity sequence. The medium further includes code that, when executed, causes the apparatus to transmit the packet from the apparatus. The packet includes the first preamble field and the first repeated preamble field.

In various embodiments, the first preamble field can be decodable by a plurality of devices, and the packet can include a second preamble field decodable by only a subset of the plurality of devices. In various embodiments, the first frequency-domain polarity sequence can include a predetermined sequence of −1 or +1. In various embodiments, the first preamble field can include a length indication that is not a multiple of 3.

In various embodiments, the medium can further include code that, when executed, causes the apparatus to generate a second repeated preamble field by multiplying a second preamble field by a second frequency-domain polarity sequence. The packet can include the other repeated preamble field. In various embodiments, the first preamble field can include a legacy signal (L-SIG) field, the legacy preamble being decodable by a plurality of devices, and the first repeated preamble field can include a repeated legacy signal (RL-SIG) field.

Another aspect provides another method of wireless communication. The method includes generating, at a wireless device, a packet. The packet includes a legacy preamble including a legacy signal (L-SIG) field, the legacy preamble being decodable by a plurality of devices. The packet further includes a second preamble (e.g., a preamble defined for communications according to a protocol, such as an IEEE 802.11ax high efficiency protocol, that is different than the protocols used in certain legacy systems) being decodable by only a subset of the plurality of devices. The method further includes generating a repeated L-SIG field (RL-SIG) by masking the first preamble field with a sequence of ±1 in the frequency-domain. The method further includes transmitting the packet from the wireless device. The packet includes the L-SIG field and the RL-SIG field.

Another aspect provides another apparatus configured to perform wireless communication. The apparatus includes one or more processors configured to generate a packet. The packet includes a legacy preamble including a legacy signal (L-SIG) field, the legacy preamble being decodable by a plurality of devices. The packet further includes a second preamble being decodable by only a subset of the plurality of devices. The processors are further configured to generate a repeated L-SIG field (RL-SIG) by masking the first preamble field with a sequence of ±1 in the frequency-domain. The apparatus further includes a transmitter configured to transmit the packet from the apparatus. The packet includes the L-SIG field and the RL-SIG field.

Another aspect provides another method of wireless communication. The method includes receiving, at a wireless device, a packet including a first preamble field and a first repeated preamble field. The method further includes generating a corrected preamble field by multiplying the first repeated preamble field by a first frequency-domain polarity sequence. The method further includes auto-correlating the first preamble field and the corrected preamble field.

In various embodiments, the first preamble field can be decodable by a plurality of devices, and the packet can include a second preamble field decodable by only a subset of the plurality of devices. In various embodiments, the method can further include refraining from decoding the packet when a result of said auto-correlating is below a threshold. In various embodiments, the first frequency-domain polarity sequence can include an inverse of a predetermined sequence of −1 or +1.

In various embodiments, the first preamble field can include a length indication that is not a multiple of 3. In various embodiments, the packet can include the other repeated preamble field, the method further including generating another corrected preamble field by multiplying the other signal field by a first frequency-domain polarity sequence.

Another aspect provides another apparatus configured to perform wireless communication. The apparatus includes a receiver configured to receive a packet including a first preamble field and a first repeated preamble field. The apparatus further includes a processor configured to generate a corrected preamble field by multiplying the first repeated preamble field by a first frequency-domain polarity sequence. The processor is further configured to auto-correlate the first preamble field and the corrected preamble field.

In various embodiments, the first preamble field can be decodable by a plurality of devices, and the packet can include a second preamble field decodable by only a subset of the plurality of devices. In various embodiments, the processor can be further configured to refrain from decoding the packet when a result of said auto-correlating is below a threshold. In various embodiments, the first frequency-domain polarity sequence can include an inverse of a predetermined sequence of −1 or +1.

In various embodiments, the first preamble field can include a length indication that is not a multiple of 3. In various embodiments, the packet can include the other repeated preamble field. The processor can be further configured to generate another corrected preamble field by multiplying the other signal field by a first frequency-domain polarity sequence.

Another aspect provides another apparatus for wireless communication. The apparatus includes means for receiving a packet including a first preamble field and a first repeated preamble field. The apparatus further includes means for generating a corrected preamble field by multiplying the first repeated preamble field by a first frequency-domain polarity sequence. The apparatus further includes means for auto-correlating the first preamble field and the corrected preamble field.

In various embodiments, the first preamble field can be decodable by a plurality of devices, and the packet can include a second preamble field decodable by only a subset of the plurality of devices. In various embodiments, the apparatus can further include means for refraining from decoding the packet when a result of said auto-correlating is below a threshold. In various embodiments, the first frequency-domain polarity sequence can include an inverse of a predetermined sequence of −1 or +1.

In various embodiments, the first preamble field can include a length indication that is not a multiple of 3. In various embodiments, the packet can include the other repeated preamble field. The apparatus can further include means for generating another corrected preamble field by multiplying the other signal field by a first frequency-domain polarity sequence.

Another aspect provides another non-transitory computer-readable medium. The medium includes code that, when executed, causes an apparatus to receive a packet including a first preamble field and a first repeated preamble field. The medium further includes code that, when executed, causes the apparatus to generate a corrected preamble field by multiplying the first repeated preamble field by a first frequency-domain polarity sequence. The medium further includes code that, when executed, causes the apparatus to auto-correlate the first preamble field and the corrected preamble field.

In various embodiments, the first preamble field can be decodable by a plurality of devices, and the packet can include a second preamble field decodable by only a subset of the plurality of devices. In various embodiments, the medium can further include code that, when executed, causes the apparatus to refrain from decoding the packet when a result of said auto-correlating is below a threshold. In various embodiments, the first frequency-domain polarity sequence can include an inverse of a predetermined sequence of −1 or +1.

In various embodiments, the first preamble field can include a length indication that is not a multiple of 3. In various embodiments, the packet can include the other repeated preamble field. The medium can further include code that, when executed, causes the apparatus to generate another corrected preamble field by multiplying the other signal field by a first frequency-domain polarity sequence.

Another aspect provides another method of wireless communication. The method includes receiving, at a wireless device, a packet. The packet includes a legacy preamble including a legacy signal (L-SIG) field, the legacy preamble being decodable by a plurality of devices. The packet further includes a repeated L-SIG field (RL-SIG). The packet further includes a second preamble being decodable by only a subset of the plurality of devices. The method further includes generating a corrected L-SIG field by masking the RL-SIG field with an inverse sequence of ±1 in the frequency-domain. The method further includes auto-correlating the L-SIG field and the corrected L-SIG field.

Another aspect provides another apparatus configured to perform wireless communication. The apparatus includes a receiver configured to receive a packet. The packet includes a legacy preamble including a legacy signal (L-SIG) field, the legacy preamble being decodable by a plurality of devices. The packet further includes a repeated L-SIG field (RL-SIG). The packet further includes a second preamble being decodable by only a subset of the plurality of devices. The apparatus further includes one or more processors configured to generate a corrected L-SIG field by masking the RL-SIG field with an inverse sequence of ±1 in the frequency-domain. The processors are further configured to auto-correlate the L-SIG field and the corrected L-SIG field.

DETAILED DESCRIPTION

Figure 1:
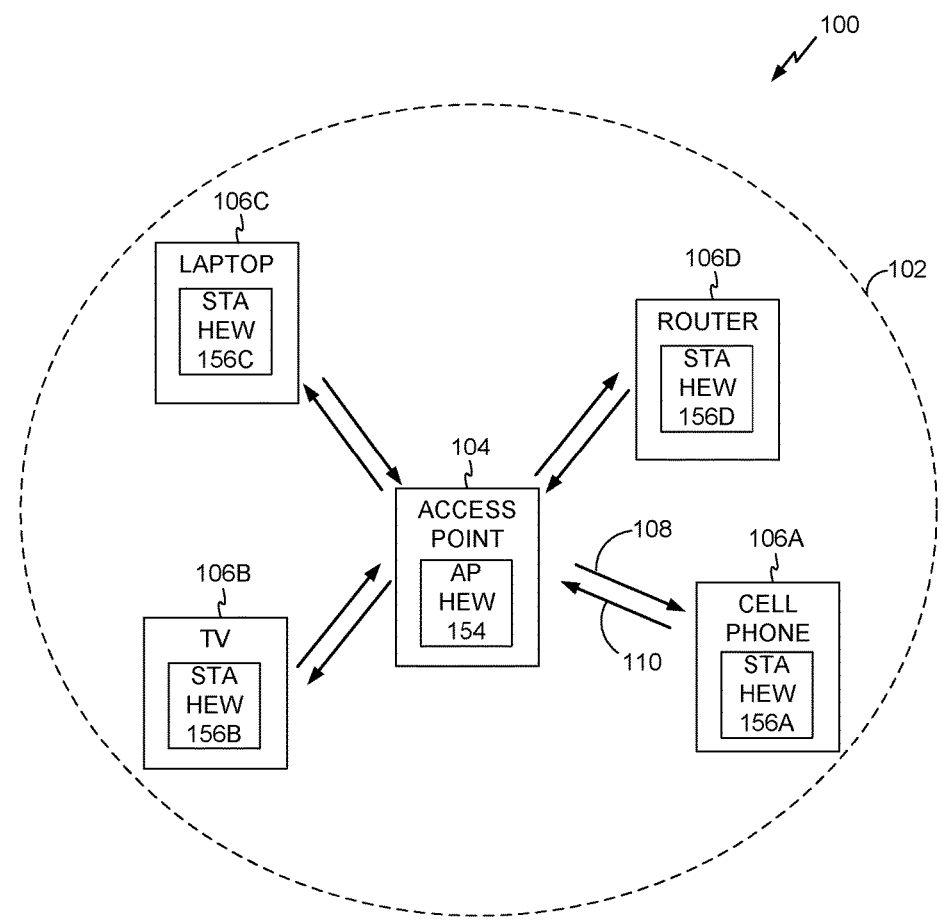
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as part of an IEEE 802.11 protocol, such as an 802.11 protocol which supports orthogonal frequency-division multiple access (OFDMA) communications.

In some aspects, wireless signals can be transmitted according to an 802.11 protocol. In some implementations, a WLAN includes various devices which are the components that access the wireless network. For example, there can be two types of devices: access points (APs) and clients (also referred to as stations, or STAs). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi compliant wireless link to obtain general connectivity to the Internet or to other wide area networks. In some implementations an STA can also be used as an AP.

An access point (AP) can also include, be implemented as, or known as a base station, wireless access point, access node or similar terminology.

A station "STA" can also include, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein can implement an 802.11 standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

It can be beneficial to allow multiple devices, such as stations (STAs), to communicate with an access point (AP) at the same time. For example, this can allow multiple STAs to receive a response from the AP in less time, and to be able to transmit and receive data from the AP with less delay. This can also allow an AP to communicate with a larger number of devices overall, and can also make bandwidth usage more efficient. By using multiple access communications, the AP can be able to multiplex orthogonal frequency-division multiplexing (OFDM) symbols to, for example, four devices at once over an 80 MHz bandwidth, where each device utilizes 20 MHz bandwidth. Thus, multiple access can be beneficial in some aspects, as it can allow the AP to make more efficient use of the spectrum available to it.

It has been proposed to implement such multiple access protocols in an OFDM system such as the 802.11 family by assigning different subcarriers (or tones) of symbols transmitted between the AP and the STAs to different STAs. In this way, an AP could communicate with multiple STAs with a single transmitted OFDM symbol, where different tones of the symbol were decoded and processed by different STAs, thus allowing simultaneous data transfer to multiple STAs. These systems are sometimes referred to as OFDMA systems.

Such a tone allocation scheme is referred to herein as a "high-efficiency" (HE) system, and data packets transmitted in such a multiple tone allocation system can be referred to as high-efficiency (HE) packets. Various structures of such packets, including backward compatible preamble fields are described in detail below.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g, 802.11b, and other/future 802.11 standards. The wireless communication system 100 can operate pursuant to a high-efficiency wireless standard, for example the 802.11ax standard. The wireless communication system 100 can include an AP 104, which communicates with STAs 106A-106D (which can be generically referred to herein as STA(s) 106).

A variety of processes and methods can be used for transmissions in the wireless communication system 100 between the AP 104 and the STAs 106A-106D. For example, signals can be sent and received between the AP 104 and the STAs 106A-106D in accordance with OFDM/OFDMA techniques. If this is the case, the wireless communication system 100 can be referred to as an OFDM/OFDMA system. Alternatively, signals can be sent and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106A-106D associated with the AP 104 and that use the AP 104 for communication can be referred to as a basic service set (BSS). It can be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high efficiency wireless controller (HEW) 154. The AP HEW 154 can perform some or all of the operations described herein to enable communications between the AP 104 and the STAs 106A-106D using the 802.11 protocol. The functionality of the AP HEW 154 is described in greater detail below with respect to FIGS. 4-10.

Alternatively or in addition, the STAs 106A-106D can include a STA HEW 156. The STA HEW 156 can perform some or all of the operations described herein to enable communications between the STAs 106A-106D and the AP 104 using the 802.11 protocol. The functionality of the STA HEW 156 is described in greater detail below with respect to FIGS. 2-10.

Figure 2:
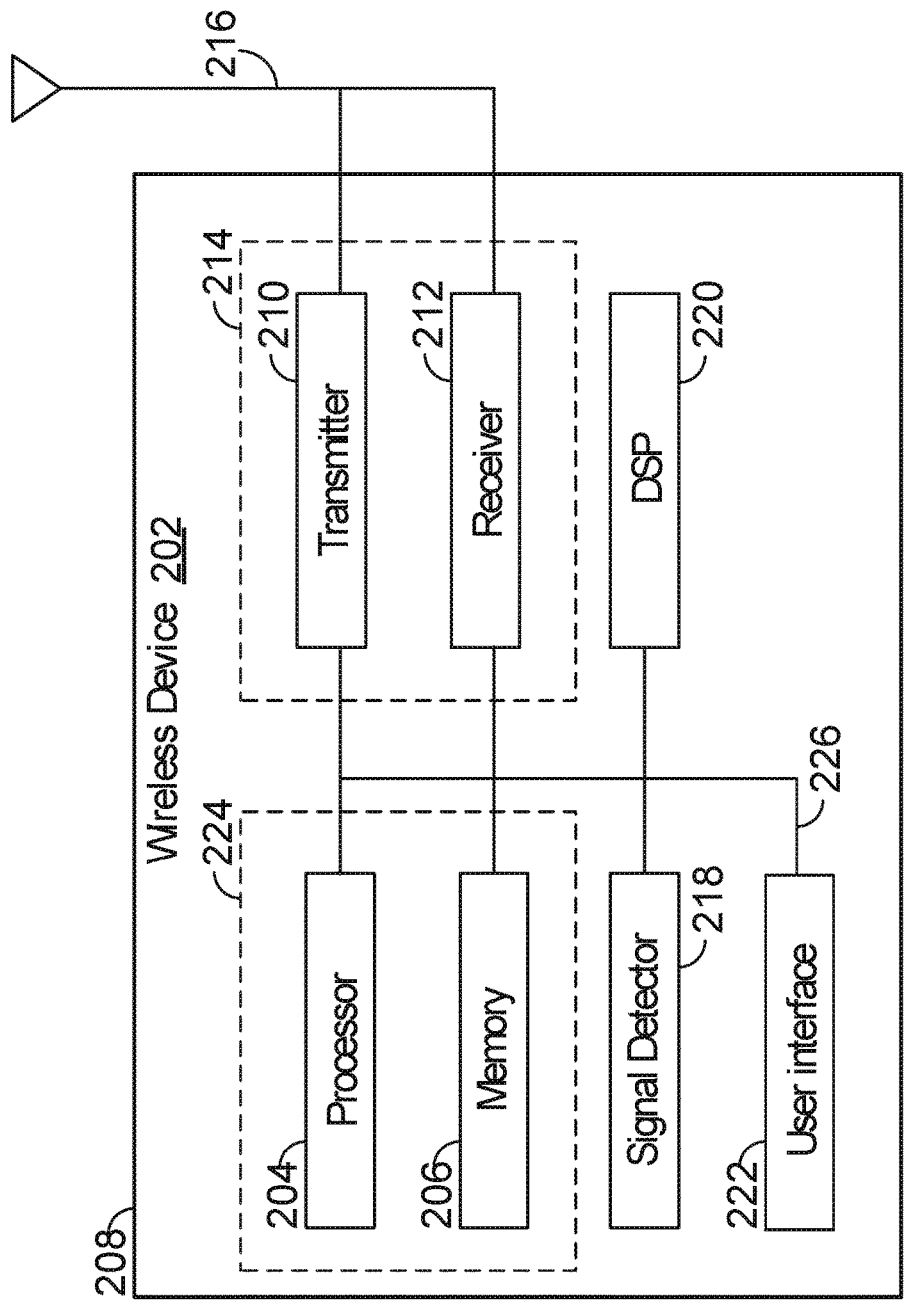
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106A-106D.

The wireless device 202 can include a processor 204 which controls operation of the wireless device 202. The processor 204 can also be referred to as a central processing unit (CPU) or hardware processor. A memory 206, which can include read-only memory (ROM) random access memory (RAM), or both, provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include multiple transmitters, multiple receivers, multiple transceivers, and/or multiple antennas, which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art can appreciate the components of the wireless device 202 can be coupled together or accept or provide inputs to each other using some other mechanism.

Although a number of separate components are illustrated in FIG. 2, those of skill in the art can recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include the AP 104 or one of the STAs 106A-106D, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Figure 3:
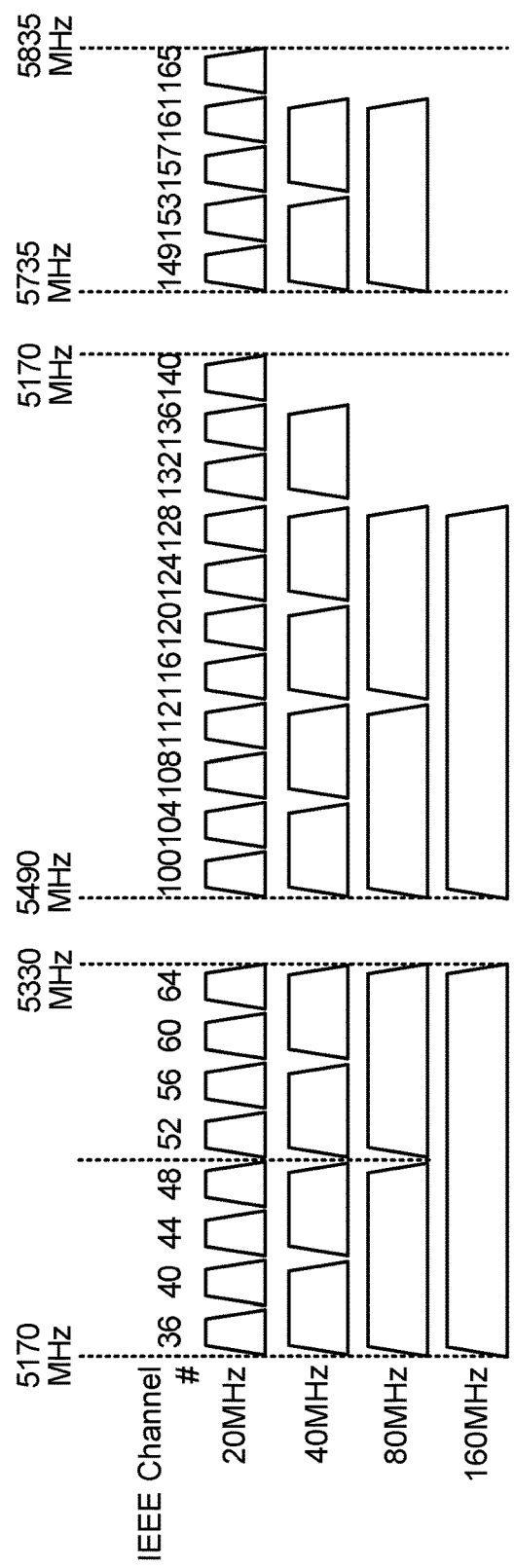
FIG. 3 illustrates a channel allocation for channels available for 802.11 systems.

FIG. 3 illustrates a channel allocation for channels available for 802.11 systems. Various IEEE 802.11 systems support a number of different sizes of channels, such as 5, 10, 20, 40, 80, and 160 MHz channels. For example, and 802.11ac device can support 20, 40, and 80 MHz channel bandwidth reception and transmission. A larger channel can include two adjacent or separated smaller channels. For example, an 80 MHz channel can include two adjacent or separated 40 MHz channels. In the at least some IEEE 802.11 systems, a 20 MHz channel contains 64 subcarriers, separated from each other by 312.5 kHz. Of these subcarriers, a smaller number can be used for carrying data. For example, a 20 MHz channel can contain transmitting subcarriers numbered −1 to −28 and 1 to 28, or 56 subcarriers. Some of these carriers can also be used to transmit pilot signals.

Figure 4:
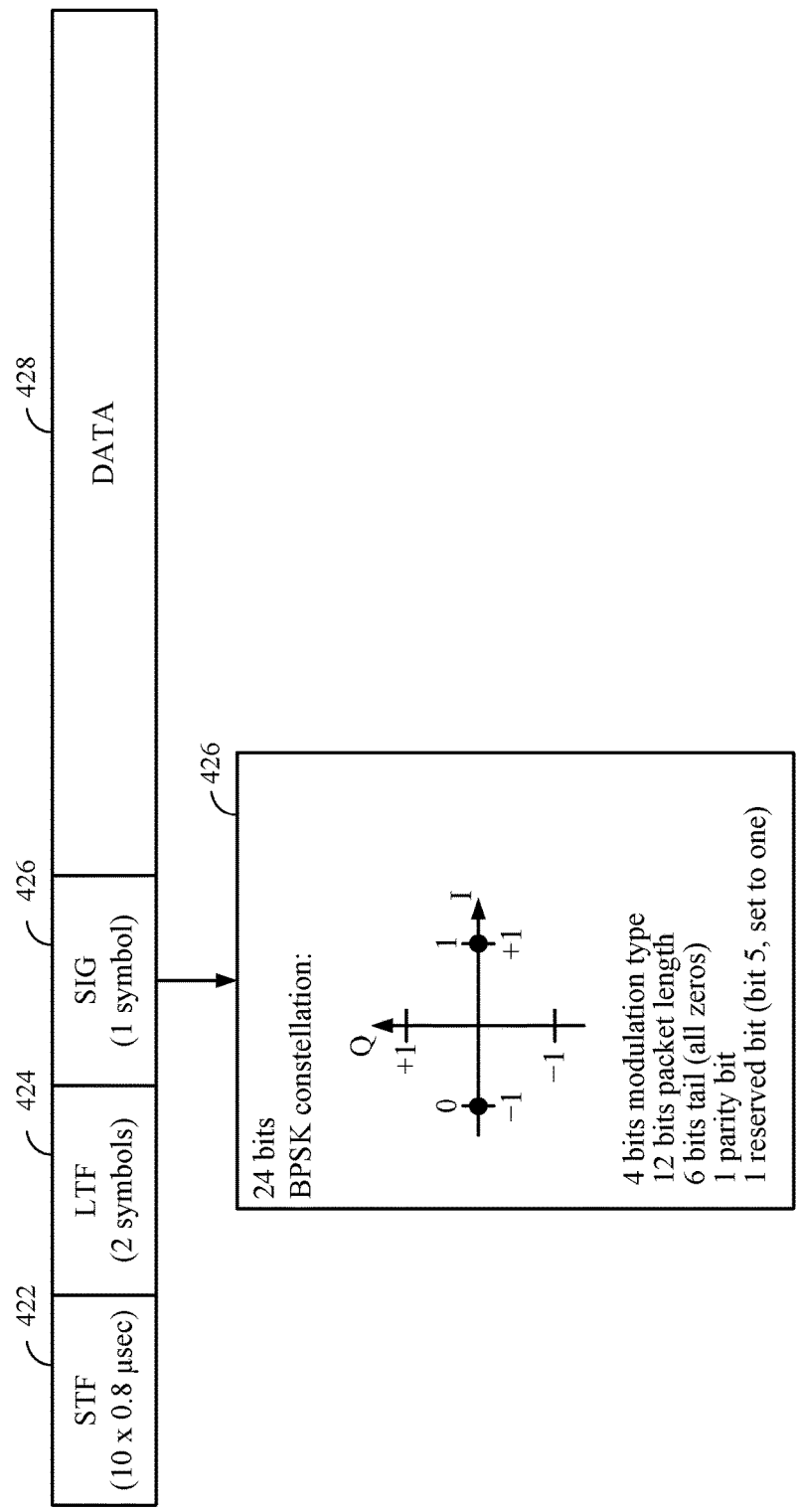
FIGS. 4 and 5 illustrate data packet formats for several IEEE 802.11 standards.
Figure 5:
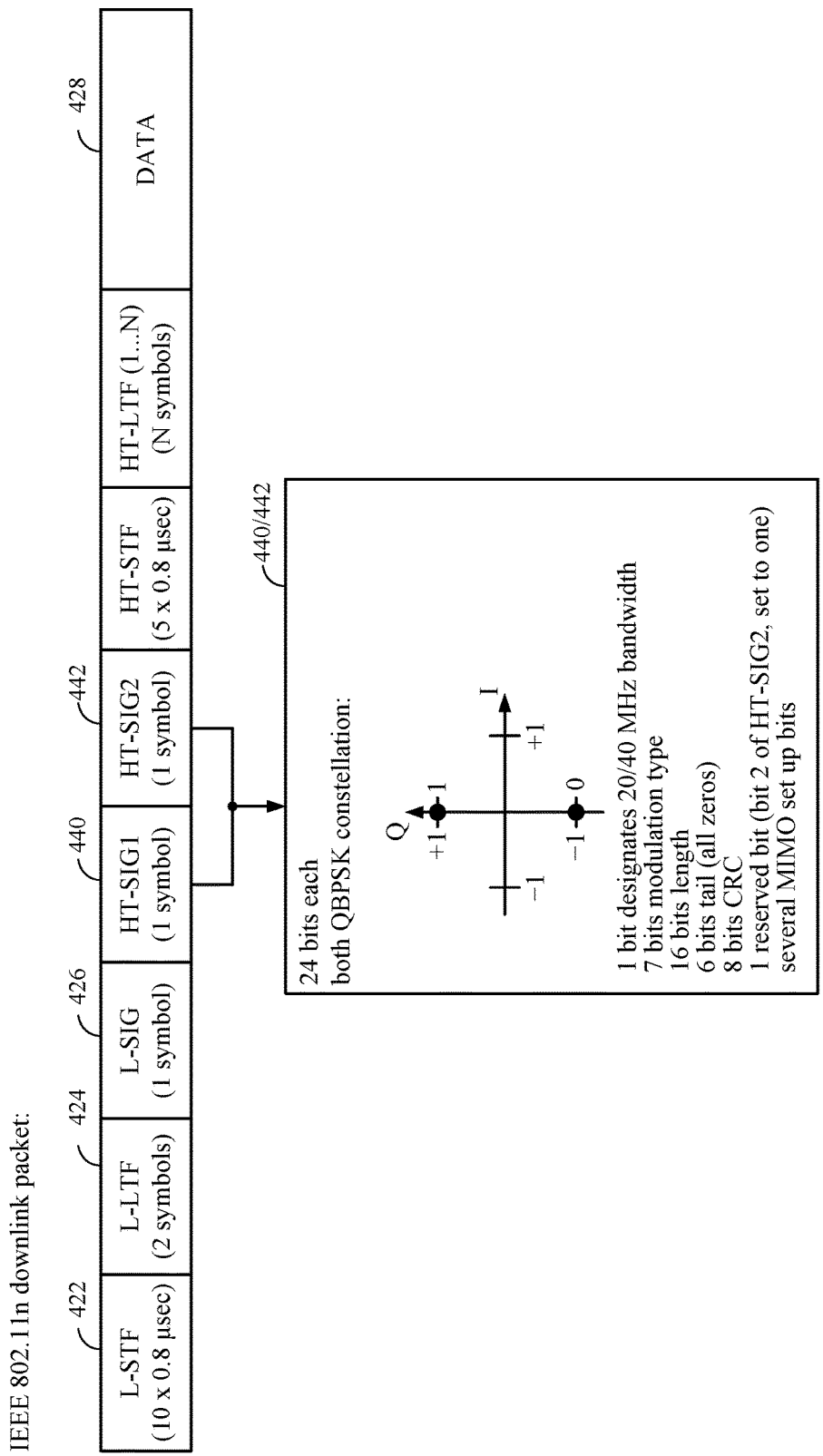

FIGS. 4 and 5 illustrate data packet formats for several IEEE 802.11 standards. Turning first to FIG. 4, a packet format for IEEE 802.11a, 11b, and 11g is illustrated. This frame includes a short training field 422, a long training field 424, and a signal field 426. The training fields do not transmit data, but they allow synchronization between the AP and the receiving STAs for decoding the data in the data field 428.

The signal field 426 delivers information from the AP to the STAs about the nature of the packet being delivered. In IEEE 802.11b/g devices, this signal field has a length of 24 bits, and is transmitted as a single OFDM symbol at a 6 Mb/s rate using BPSK modulation and a code rate of ½. The information in the SIG field 426 includes 4 bits describing the modulation scheme of the data in the packet (e.g., BPSK, 16QAM, 64QAM, etc.), and 12 bits for the packet length. This information is used by a STA to decode the data in the packet when the packet is intended for the STA. When a packet is not intended for a particular STA, the STA can defer any communication attempts during the time period defined in the length field of the SIG symbol 426, and can, to save power, enter a sleep mode during the packet period of up to about 5.5 msec.

As features have been added to IEEE 802.11, changes to the format of the SIG fields in data packets were developed to provide additional information to STAs. FIG. 5 shows the packet structure for the IEEE 802.11n packet. The 11n addition to the IEEE.802.11 standard added MIMO functionality to IEEE.802.11 compatible devices. To provide backward compatibility for systems containing both IEEE 802.11b/g devices and IEEE 802.11n devices, the data packet for IEEE 802.11n systems also includes the STF, LTF, and SIG fields of these earlier systems, noted as L-STF 422, L-LTF 424, and L-SIG 426 with a prefix L to denote that they are "legacy" fields. To provide the needed information to STAs in an IEEE 802.11n environment, two additional signal symbols 440 and 442 were added to the IEEE 802.11n data packet. In contrast with the SIG field and L-SIG field 426, however, these signal fields used rotated BPSK modulation (also referred to as QBPSK modulation). When a legacy device configured to operate with IEEE 802.11b/g receives such a packet, it can receive and decode the L-SIG field 426 as a normal 11/b/g packet. However, as the device continued decoding additional bits, they may not be decoded successfully because the format of the data packet after the L-SIG field 426 is different from the format of an 11/b/g packet, and the CRC check performed by the device during this process can fail. This causes these legacy devices to stop processing the packet, but still defer any further operations until a time period has passed defined by the length field in the initially decoded L-SIG. In contrast, new devices compatible with IEEE 802.11n would sense the rotated modulation in the HT-SIG fields, and process the packet as an 802.11n packet. Furthermore, an 11n device can tell that a packet is intended for an 11/b/g device because if it senses any modulation other than QBPSK in the symbol following the L-SIG 426, it can ignore it as an 11/b/g packet. After the HT-SIG1 and SIG2 symbols, additional training fields suitable for MIMO communication are provided, followed by the data 428.

Figure 6:
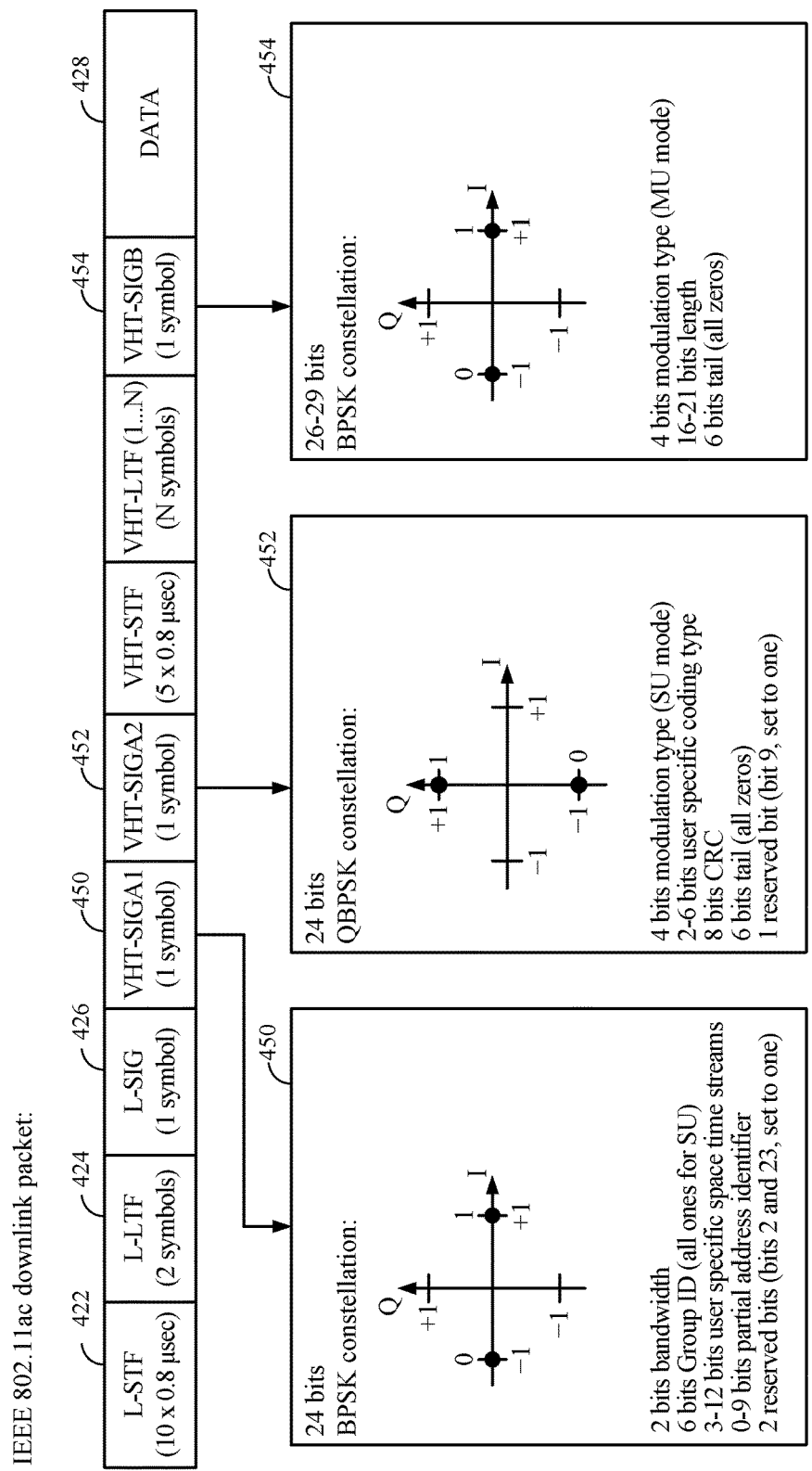
FIG. 6 illustrates a frame format for the IEEE 802.11ac standard.

FIG. 6 illustrates a frame format for the IEEE 802.11ac standard, which added multi-user MIMO functionality to the IEEE 802.11 family. Similar to IEEE 802.11n, an 802.11ac frame contains the same legacy short training field (L-STF) 422 and long training field (L-LTF) 424. An 802.11ac frame also contains a legacy signal field L-SIG 426 as described above.

Next, an 802.11ac frame includes a Very High Throughput Signal (VHT-SIG-A1 450 and A2 452) field two symbols in length. This signal field provides additional configuration information related to 11ac features that are not present in 11/b/g and 11n devices. The first OFDM symbol 450 of the VHT-SIG-A can be modulated using BPSK, so that any 802.11n device listening to the packet can believe the packet to be an 802.11a packet, and can defer to the packet for the duration of the packet length as defined in the length field of the L-SIG 426. Devices configured according to 11/g can be expecting a service field and MAC header following the L-SIG 426 field. When they attempt to decode this, a CRC failure can occur in a manner similar to the procedure when an 11n packet is received by an 11b/g device, and the 11/b/g devices can also defer for the period defined in the L-SIG field 426. The second symbol 452 of the VHT-SIG-A is modulated with a 90-degree rotated BPSK. This rotated second symbol allows an 802.11ac device to identify the packet as an 802.11ac packet. The VHT-SIGA1 450 and A2 452 fields contain information on a bandwidth mode, modulation and coding scheme (MCS) for the single user case, number of space time streams (NSTS), and other information. The VHT-SIGA1 450 and A2 452 can also contain a number of reserved bits that are set to "1." The legacy fields and the VHT-SIGA1 and A2 fields can be duplicated over each 20 MHz of the available bandwidth. Although duplication may be constructed in some implementations to mean making or being an exact copy, certain differences may exist when fields, etc. are duplicated as described herein. For example, other implementations may intentionally duplicate the fields to have certain differences.

After the VHT-SIG-A, an 802.11ac packet can contain a VHT-STF, which is configured to improve automatic gain control estimation in a multiple-input and multiple-output (MIMO) transmission. The next 1 to 8 fields of an 802.11ac packet can be VHT-LTFs. These can be used for estimating the MIMO channel and then equalizing the received signal. The number of VHT-LTFs sent can be greater than or equal to the number of spatial streams per user. Finally, the last field in the preamble before the data field is the VHT-SIG-B 454. This field is BPSK modulated, and provides information on the length of the useful data in the packet and, in the case of a multiple user (MU) MIMO packet, provides the MCS. In a single user (SU) case, this MCS information is instead contained in the VHT-SIGA2. Following the VHT-SIG-B, the data symbols are transmitted Although 802.11ac introduced a variety of new features to the 802.11 family, and included a data packet with preamble design that was backward compatible with 11/g/n devices and also provided information necessary for implementing the new features of 11ac, configuration information for OFDMA tone allocation for multiple access is not provided by the 11ac data packet design. New preamble configurations are desired to implement such features in any future version of IEEE 802.11 or any other wireless network protocol using OFDM subcarriers.

Figure 7:
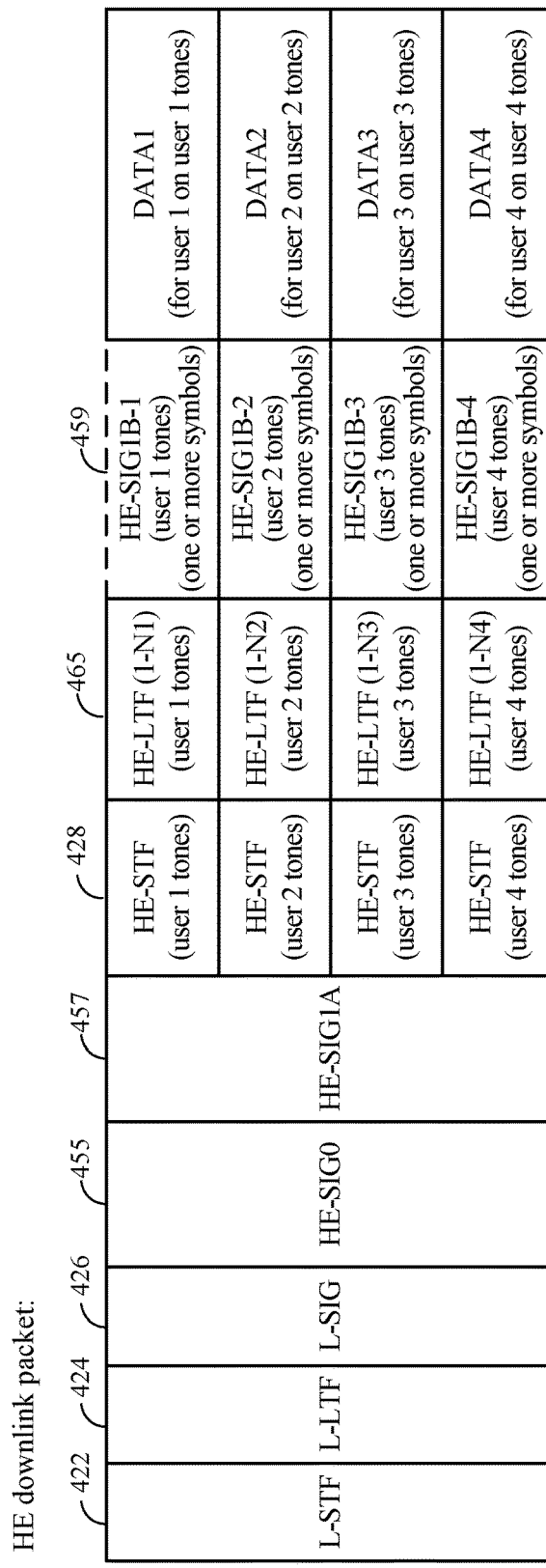
FIG. 7 illustrates an exemplary structure of a physical-layer packet which can be used to enable backward-compatible multiple access wireless communications.

FIG. 7 illustrates an exemplary structure of a physical-layer packet which can be used to enable backward-compatible multiple access wireless communications. In this example physical-layer packet, a legacy preamble including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet can include additional fields, fields can be rearranged, removed, and/or resized, and the contents of the fields varied. This packet also contains an HE-SIG0 symbol 455, and one or more HE-SIG1A symbols 457 (which can be variable in length), and an optional HE-SIG1B symbol 459 (which can be analogous to the VHT-SIG1B field 454 of FIG. 6). In various embodiments, the structure of these fields can be backward compatible with IEEE 802.11b/g/n/ac devices, and can also signal OFDMA HE devices that the packet is an HE packet. To be backward compatible with IEEE 802.11b/g/n/ac devices, appropriate modulation can be used on each of these symbols. In some implementations, the HE-SIG0 field 455 can be modulated with BPSK modulation. This can have the same effect on 802.11b/g/n devices as is currently the case with 802.11ac packets that also have their first SIG symbol BPSK modulated. For these devices, it does not matter what the modulation is on the subsequent HE-SIG symbols 457. In various embodiments, the HE-SIG0 field 455 can be modulated and repeated across multiple channels.

In various embodiments, the HE-SIG1A field 457 can be BPSK or QBPSK modulated. If BPSK modulated, an 11ac device can assume the packet is an 802.11b/g packet, and can stop processing the packet, and can defer for the time defined by the length field of L-SIG 426. If QBPSK modulated, an 802.11ac device can produce a CRC error during preamble processing, and can also stop processing the packet, and can defer for the time defined by the length field of L-SIG. To signal HE devices that this is an HE packet, at least the first symbol of HE-SIG1A 457 can be QBPSK modulated.

The information necessary to establish an OFDMA multiple access communication can be placed in the HE-SIG fields 455, 457, and 459 in a variety of positions. In various embodiments, the HE-SIG0 455 can include one or more of: a duration indication, a bandwidth indication (which can be, for example, 2 bits), a BSS color ID (which can be, for example, 3 bits), an UL/DL indication (which can be, for example, a 1-bit flag), a cyclic redundancy check (CRC) (which can be, for example, 4 bits), and a clear channel assessment (CCA) indication (which can be, for example, 2 bits).

In various embodiments, the HE-SIG1 field 457 can include a tone allocation information for OFDMA operation. The example of FIG. 7 can allow four different users to be each assigned a specific sub-band of tones and a specific number of MIMO space time streams. In various embodiments, 12 bits of space time stream information allows three bits for each of four users such that 1-8 streams can be assigned to each one. 16 bits of modulation type data allows four bits for each of four users, allowing assignment of any one of 16 different modulation schemes (16QAM, 64QAM, etc.) to each of four users. 12 bits of tone allocation data allows specific sub-bands to be assigned to each of four users.

One example SIG field scheme for sub-band (also referred to herein as sub-channel) allocation includes a 6-bit Group ID field as well as 10 bits of information to allocate sub-band tones to each of four users. The bandwidth used to deliver a packet can be allocated to STAs in multiples of some number of MHz. For example, the bandwidth can be allocated to STAs in multiples of B MHz. The value of B can be a value such as 1, 2, 5, 10, 15, or 20 MHz. The values of B can be provided by a two bit allocation granularity field. For example, the HE-SIG1A 457 can contain one two-bit field, which allows for four possible values of B. For example, the values of B can be 5, 10, 15, or 20 MHz, corresponding to values of 0-3 in the allocation granularity field. In some aspects, a field of k bits can be used to signal the value of B, defining a number from 0 to N, where 0 represents the least flexible option (largest granularity), and a high value of N represents the most flexible option (smallest granularity). Each B MHz portion can be referred to as a sub-band.

The HE-SIG1A 457 can further use 2 bits per user to indicate the number of sub-bands allocated to each STA. This can allow 0-3 sub-bands to be allocated to each user. The group-id (G_ID) can be used in order to identify the STAs, which can receive data in an OFDMA packet. This 6-bit G_ID can identify up to four STAs, in a particular order, in this example.

The training fields and data which are sent after the HE-SIG symbols can be delivered by the AP according to the allocated tones to each STA. This information can potentially be beamformed. Beamforming this information can have certain advantages, such as allowing for more accurate decoding and/or providing more range than non-beamformed transmissions.

Depending on the space time streams assigned to each user, different users can use a different number of HE-LTFs 465. Each STA can use a number of HE-LTFs 465 that allows channel estimation for each spatial stream associated with that STA, which can be generally equal to or more than the number of spatial streams. LTFs can also be used for frequency offset estimation and time synchronization. Because different STAs can receive a different number of HE-LTFs, symbols can be transmitted from the AP 104 (FIG. 1) that contain HE-LTF information on some tones and data on other tones.

In some aspects, sending both HE-LTF information and data on the same OFDM symbol can be problematic. For example, this can increase the peak-to-average power ratio (PAPR) to too high a level. Thus, it can be beneficial to instead to transmit HE-LTFs 465 on all tones of the transmitted symbols until each STA has received at least the required number of HE-LTFs 465. For example, each STA can need to receive one HE-LTF 465 per spatial stream associated with the STA. Thus, the AP can be configured to transmit a number of HE-LTFs 465 to each STA equal to the largest number of spatial streams assigned to any STA. For example, if three STAs are assigned a single spatial stream, but the fourth STA is assigned three spatial streams, in this aspect, the AP can be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs can be interleaved. For example, if each of user-1 and user-2 receive three sub-bands, while user-4 receives two sub-bands, these sub-bands can be interleaved across the entire AP bandwidth. For example, these sub-bands can be interleaved in an order such as 1, 2, 4, 1, 2, 4, 1, 2. In some aspects, other methods of interleaving the sub-bands can also be used. In some aspects, interleaving the sub-bands can reduce the negative effects of interferences or the effect of poor reception from a particular device on a particular sub-band. In some aspects, the AP can transmit to STAs on the sub-bands that the STA prefers. For example, certain STAs can have better reception in some sub-bands than in others. The AP can thus transmit to the STAs based at least in part on which sub-bands the STA can have better reception. In some aspects, the sub-bands can also not be interleaved. For example, the sub-bands can instead be transmitted as 1, 1, 1, 2, 2, 2, 4, 4. In some aspects, it can be pre-defined whether or not the sub-bands are interleaved.

In the example of FIG. 7, HE-SIG0 455 symbol modulation can be used to signal HE devices that the packet is an HE packet. Other methods of signaling HE devices that the packet is an HE packet can also be used. In the example of FIG. 7, the L-SIG 426 can contain information that instructs HE devices that an HE preamble can follow the legacy preamble. For example, the L-SIG 426 can contain a low-energy, 1-bit code on the Q-rail which indicates the presence of a subsequent HE preamble to HE devices sensitive to the Q signal during the L-SIG 426. A very low amplitude Q signal can be used because the single bit signal can be spread across all the tones used by the AP to transmit the packet. This code can be used by high efficiency devices to detect the presence of an HE-preamble/packet. The L-SIG 426 detection sensitivity of legacy devices need not be significantly impacted by this low-energy code on the Q-rail. Thus, these devices can be able to read the L-SIG 426, and not notice the presence of the code, while HE devices can be able to detect the presence of the code. In this implementation, all of the HE-SIG fields can be BPSK modulated if desired, and any of the techniques described herein related to legacy compatibility can be used in conjunction with this L-SIG signaling.

In various embodiments, any HE-SIG field 455-459 can contain bits defining user-specific modulation type for each multiplexed user. For example, the optional HE-SIG1B 459 field can contain bits defining user-specific modulation type for each multiplexed user.

In some aspects, wireless signals can be transmitted in a low-rate (LR) mode, for example according the 802.11ax protocol. Particularly, in some embodiments, the AP 104 can have a greater transmit power capability compared to the STAs 106. In some embodiments, for example, the STAs 106 can transmit at several dB lower than the AP 104. Thus, DL communications from the AP 104 to the STAs 106 can have a higher range than UL communications from the STAs 106 to the AP 104. In order to close the link budget, the LR mode can be used. In some embodiments, the LR mode can be used in both DL and UL communications. In other embodiments, the LR mode is only used for UL communications.

In some embodiments, the HEW STAs 106 can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 4 ms and a 4× symbol duration can be 16 ms. Thus, in various embodiments, 1× symbols can be referred to herein as legacy symbols and 4× symbols can be referred to as HEW symbols. In other embodiments, different durations are possible.

In some embodiments, legacy devices can be constrained to an L-SIG field having a length field evenly divisible by 3. For example, referring back to FIG. 6, the L-SIG 426 can include a length field evenly divisible by 3, which can also be described as a multiple of three, or wherein length modulo 3 is equal to 0. In some embodiments, HEW devices can use an L-SIG field having a length not evenly divisible by 3 to indicate a HEW packet. For example, the length indication, modulo 3, can be equal to 1 or 2. In various embodiments, the modulus of an L-SIG length indication can indicate one or more of: a guard interval (GI) mode for one or more later symbols, or an HE-LTF compression mode.

Figure 8:
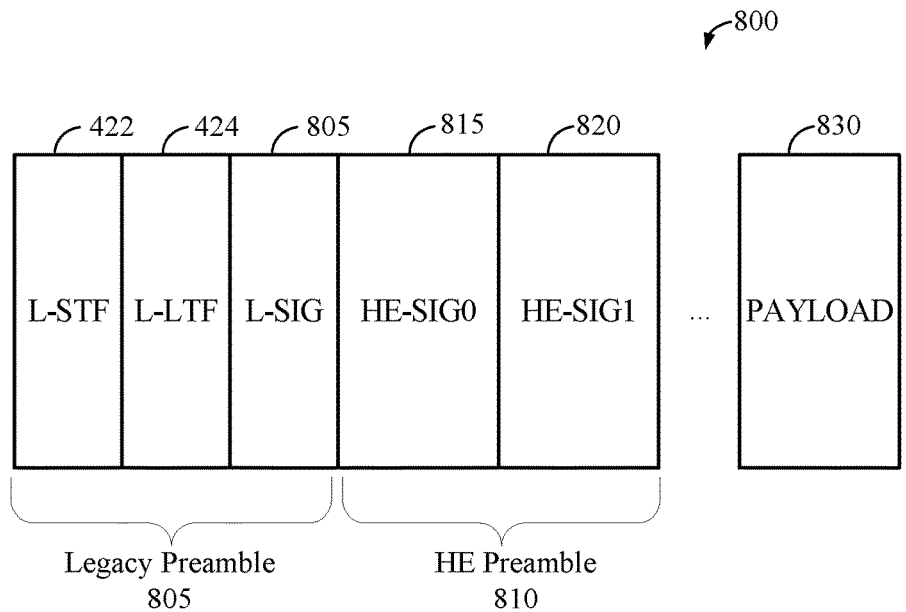
FIG. 8 illustrates an exemplary structure of an uplink or downlink physical-layer packet which can be used to enable wireless communications.

FIG. 8 illustrates an exemplary structure of an uplink or downlink physical-layer packet 800 which can be used to enable wireless communications. In the illustrated embodiment, the physical-layer packet 800 includes a legacy preamble 805 including the L-STF 422, L-LTF 426, and an L-SIG 805, and an HE preamble 810 including an HE-SIG0 815 and an HE-SIG1 820, and a payload 830. A person having ordinary skill in the art will appreciate that the illustrated physical-layer packet 800 can include additional fields, fields can be rearranged, removed, and/or resized, and the contents of the fields varied. For example, in various embodiments, the HE preamble 810 can further include one or more of: an HE-STF, an HE-LTF, one or more additional HE-SIG1 fields, one or more repeated fields, etc.

Certain aspects of the present disclosure support mixing MU-MIMO and OFDMA techniques in the frequency domain in a same PPDU. In some embodiments, a first portion of the PPDU bandwidth can be transmitted as a one of at least a MU-MIMO transmission and an OFDMA transmission. A second portion of the PPDU bandwidth can be transmitted as one of at least a MU-MIMO transmission and an OFDMA transmission. In various embodiments, each portion can be referred to as a "zone." Thus, in various embodiments, the first and second portions can include any combination such as MU-MIMO/OFDMA, MU-MIMO/MU-MIMO, OFDMA/OFDMA, and OFDMA/OFDMA.

In some embodiments, the PPDU bandwidth can include more than two portions or zones. In some embodiments, the PPDU bandwidth can be limited to a single zone or a maximum of two zones. In these embodiments, MU-MIMO or OFDMA transmissions can be sent simultaneously from an AP to multiple STAs and can create efficiencies in wireless communication.

In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. Any combination of the HE-SIG0 815, the HE-STF 820, the HE-STF, the HE-LTF, the HE-SIG1 820, and the payload 830 can be transmitted for each of one or more OFDMA users. For example, two users can share the illustrated 40 MHz bandwidth, and a portion of the 40 MHz bandwidth can be unassigned.

Although the packet 800 is referred to herein as a single packet, in various embodiments the transmissions associated with each zone, or alternatively with each user, can be referred to as a separate packet. Although the packet 800 can be used for UL and DL transmissions, UL transmissions will be discussed in greater detail herein. A person having ordinary skill in the art will appreciate that discussion related to UL transmissions from the STAs 106 to the AP 104 can also be applied to DL transmissions from the AP 104 to the STAs 106.

In the illustrated embodiment, the packet 800 uses a 1× symbol duration. In other embodiments, the 4× symbol duration can be used for at least a portion of the packet 800 such as, for example, any portion of the HE preamble 810 and/or the payload 830. In the illustrated embodiment, the L-STF 422 is 8 μs (i.e., two 1× symbols) long, the L-LTF 424 is 8 μs (i.e., two 1× symbols) long, the L-SIG 426 is 4 μs (i.e., one 1× symbol) long, the HE-SIG0 815 is 4 μs (i.e., one 1× symbol) long, and the HE-SIG1 820 is 4 μs (i.e., one 1× symbol) long. In various embodiments, the HE-STF can be from 4 μs (i.e., one 1× symbol) long to 8 μs (i.e., two 1× symbols) long, and the HE-LTF can be a variable length, which can be dependent on the number of spatial streams (NSS) used for transmission of the payload 830.

L-SIG Length Field

In some embodiments, the L-SIG field 805 can include a length indication. As discussed above, HEW devices can set the L-SIG 805 length indication to a value not evenly divisible by 3 in order to indicate that the packet 800 is a HEW packet. For example, the L-SIG 805 length indication can be set such that the length, modulo 3 (referred to herein as "LM3"), is equal to 1 or 2. In some embodiments, the HEW device, such as the STA 106 or the AP 104, can pad the packet 800, or otherwise adjust the length of the packet, to match the L-SIG 805 length indication.

In one embodiment, the value of the L-SIG 805 length indication, modulo 3, can indicate a guard interval (GI) mode for one or more later symbols. For example, in one embodiment, the AP 104 can set the LM3 to 1 in order to indicate that subsequent symbols will use a short guard interval (for example, 0.4 μs). The AP 104 can set the LM3 to 2 in order to indicate that subsequent symbols will use a long guard interval (for example, 0.8 μs).

In other embodiments, the opposite can be true. Thus, the AP 104 can set the LM3 to 2 in order to indicate that subsequent symbols will use a short guard interval (for example, 0.4 μs). The AP 104 can set the LM3 to 1 in order to indicate that subsequent symbols will use a long guard interval (for example, 0.8 μs).

In other embodiments, the LM3 can indicate one of three different guard intervals, for example short, medium, and long guard intervals (wherein short guard intervals are shorter than medium guard intervals, which in turn are shorter than long guard intervals). The short, medium, and/or long guard interval indication can correspond to preset or dynamically determined guard interval lengths. As an example, LM3=0 can indicate the short guard interval length, LM3=1 can indicate the medium guard interval length, and LM3=2 can indicate the long guard interval length. Such example is merely illustrative, however, and any mapping from LM3 to guard interval indication can be used.

In various embodiments, the GI mode indicated via the LM3 can begin immediately after the L-SIG 805. For example, the GI mode indicated via the LM3 can begin at the HE-SIG0 field 815. In some embodiments, the GI mode indicated via the LM3 can begin a preset number of symbols after the L-SIG 805 such as, for example, 1 symbol after the L-SIG 805. Setting the GI mode, for example, 1 symbol after the L-SIG 805 can allow a hardware butterfly to adapt to a new GI mode. Thus, in some embodiments, the GI mode indicated via the LM3 can begin at the HE-SIG1 field 820.

In some embodiments, one or more subsequent fields can be repeated in time or in frequency subcarriers (tones) such as, for example, the HE-SIG0 field 815 or the HE-SIG1 field 820. The LM3 can indicate whether or not a specific subsequent field is repeated in the packet 800. For example, LM3=1 can indicate that the HE-SIG0 field 815 is not repeated and LM3=2 can indicate that the HE-SIG0 field 815 is repeated (or, in other embodiments, vice versa). The LM3 can indicate one of three repetition options. For example, LM3=0 can indicate that no subsequent fields are repeated, LM3=1 can indicate that the HE-SIG0 field 815 is repeated, and LM3=2 can indicate that the HE-SIG1 field 820 is repeated.

In some embodiments, one or more subsequent symbols can have more than one GI option such as, for example, short or long guard intervals. The LM3 can indicate whether or not some subsequent symbols have more than one GI option. For example, LM3=1 can indicate that one or more subsequent symbols have multiple GI options and LM3=2 can indicate subsequent symbols have only one GI option (or, in other embodiments, vice versa). The LM3 can indicate one of three GI options. For example, LM3=0 can indicate that subsequent fields have only one GI option, LM3=1 can indicate that some subsequent fields have two GI options, and LM3=2 can indicate that some subsequent fields have 3 GI options.

In some embodiments, one or more subsequent symbols can have more than one MCS option. The LM3 can indicate whether or not some subsequent symbols have more than one MCS option. For example, LM3=1 can indicate that one or more subsequent symbols have multiple MCS options and LM3=2 can indicate subsequent symbols have only one MCS option (or, in other embodiments, vice versa). The LM3 can indicate one of three MCS options. For example, LM3=0 can indicate that subsequent fields have only one MCS option, LM3=1 can indicate that some subsequent fields have two MCS options, and LM3=2 can indicate that some subsequent fields have 3 MCS options.

In some embodiments, the LM3 can indicate a specific MCS for the HE-SIG0 815 and/or the HE-SIG1 820. For example, LM3=1 can indicate that one or more subsequent symbols use MCS 0 and LM3=2 can indicate subsequent symbols use MCS 1 (or, in other embodiments, vice versa). The LM3 can indicate one of three MCS options. For example, LM3=0 can indicate that subsequent fields use MCS 0, LM3=1 can indicate that some subsequent symbols use MCS 1, and LM3=2 can indicate that some subsequent fields use MCS 2. Although the above examples are illustrative, different LM3 values can correspond to any specific preset or dynamically determined MCS.

In some embodiments, one or more subsequent symbols can optionally support a lower signal-to-interference-plus-noise ratio (SINR). The lower SINR can be lower than a SINR of other symbols in the packet 800. The LM3 can indicate whether or not some subsequent symbols support the lower SINR. For example, LM3=1 can indicate that one or more subsequent symbols support the lower SINR and LM3=2 can indicate subsequent symbols do not support the lower SINR (or, in other embodiments, vice versa). The LM3 can indicate one of three SINR support options. For example, LM3=0 can indicate that subsequent fields do not support the lower SINR, LM3=1 can indicate that some subsequent fields support the lower SINR, and LM3=2 can indicate that some subsequent fields support more than two SINR options.

In some embodiments, one or more subsequent fields can optionally support multiple compression modes. The LM3 can indicate whether or not some subsequent symbols support the lower SINR. For example, LM3=1 can indicate that one or more subsequent fields support multiple compression modes and LM3=2 can indicate subsequent fields do not support multiple compression modes (or, in other embodiments, vice versa). The LM3 can indicate a compression mode for a specific field such as, for example, an HE-LTF field. For example, LM3=1 can indicate that the HE-LTF field uses a first compression mode and LM3=2 can indicate that the HE-LTF field uses a first compression mode (or, in other embodiments, vice versa). The LM3 can indicate one of three compression mode options. For example, LM3=0 can indicate that the HE-LTF field uses a first compression mode, LM3=1 can indicate that the HE-LTF field uses a second compression mode, and LM3=2 can indicate that the HE-LTF field uses a third compression mode.

Figure 9:
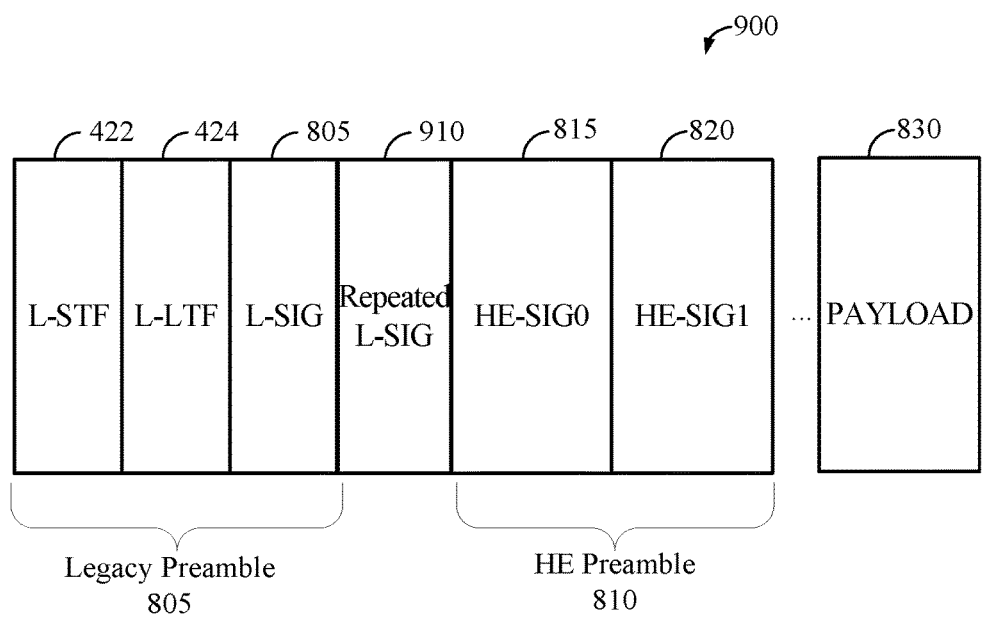
FIG. 9 illustrates another exemplary structure of an uplink physical-layer packet which can be used to enable wireless communications.

FIG. 9 illustrates another exemplary structure of an uplink or downlink physical-layer packet 900 which can be used to enable wireless communications. In the illustrated embodiment, the physical-layer packet 900 includes a legacy preamble 805 including the L-STF 422, L-LTF 426, and an L-SIG 805, a repeated L-SIG 910, and an HE preamble 810 including an HE-SIG0 815 and an HE-SIG1 820, and a payload 830. A person having ordinary skill in the art will appreciate that the illustrated physical-layer packet 900 can include additional fields, fields can be rearranged, removed, and/or resized, and the contents of the fields varied. For example, in various embodiments, the HE preamble 810 can further include one or more of: an HE-STF, an HE-LTF, one or more additional HE-SIG1 fields, one or more repeated fields, etc.

Certain aspects of the present disclosure support mixing MU-MIMO and OFDMA techniques in the frequency domain in a same PPDU. In some embodiments, a first portion of the PPDU bandwidth can be transmitted as a one of at least a MU-MIMO transmission and an OFDMA transmission. A second portion of the PPDU bandwidth can be transmitted as one of at least a MU-MIMO transmission and an OFDMA transmission. In various embodiments, each portion can be referred to as a "zone." Thus, in various embodiments, the first and second portions can include any combination such as MU-MIMO/OFDMA, MU-MIMO/MU-MIMO, OFDMA/OFDMA, and OFDMA/OFDMA.

In some embodiments, the PPDU bandwidth can include more than two portions or zones. In some embodiments, the PPDU bandwidth can be limited to a single zone or a maximum of two zones. In these embodiments, MU-MIMO or OFDMA transmissions can be sent simultaneously from an AP to multiple STAs and can create efficiencies in wireless communication.

In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. Any combination of the HE-SIG0 815, the HE-STF 820, the HE-STF, the HE-LTF, the HE-SIG1 820, and the payload 830 can be transmitted for each of one or more OFDMA users. For example, two users can share the illustrated 40 MHz bandwidth, and a portion of the 40 MHz bandwidth can be unassigned.

Although the packet 900 is referred to herein as a single packet, in various embodiments the transmissions associated with each zone, or alternatively with each user, can be referred to as a separate packet. Although the packet 900 can be used for UL and DL transmissions, UL transmissions will be discussed in greater detail herein. A person having ordinary skill in the art will appreciate that discussion related to UL transmissions from the STAs 106 to the AP 104 can also be applied to DL transmissions from the AP 104 to the STAs 106.

In the illustrated embodiment, the packet 900 uses a 1× symbol duration. In other embodiments, the 4× symbol duration can be used for at least a portion of the packet 900 such as, for example, any portion of the HE preamble 810 and/or the payload 830. In the illustrated embodiment, the L-STF 422 is 8 μs (i.e., two 1× symbols) long, the L-LTF 424 is 8 μs (i.e., two 1× symbols) long, the L-SIG 426 is 4 μs (i.e., one 1× symbol) long, the HE-SIG0 815 is 4 μs (i.e., one 1× symbol) long, and the HE-SIG1 820 is 4 μs (i.e., one 1× symbol) long. In various embodiments, the HE-STF can be from 4 μs (i.e., one 1× symbol) long to 8 μs (i.e., two 1× symbols) long, and the HE-LTF can be a variable length, which can be dependent on the number of spatial streams (NSS) used for transmission of the payload 830.

As shown in FIG. 9, the L-SIG field 805 is repeated as the repeated L-SIG field 910 (RL-SIG). In various embodiments, the L-SIG field 805 can be repeated in time or in frequency subcarriers (tones). The repeated L-SIG field 910 can include the same length indication of the L-SIG field 805. Thus, as discussed above, HEW devices can set the repeated L-SIG 910 length indication to a value not evenly divisible by 3 in order to indicate that the packet 800 is a HEW packet.

In various embodiments, the GI mode indicated via the LM3 can begin immediately after the L-SIG 805. For example, the GI mode indicated via the LM3 can begin at the repeated L-SIG 910. In some embodiments, the GI mode indicated via the LM3 can begin a preset number of symbols after the L-SIG 805 such as, for example, 1 symbol after the L-SIG 805. Setting the GI mode, for example, 1 symbol after the L-SIG 805 can allow a hardware butterfly to adapt to a new GI mode. Thus, in some embodiments, the GI mode indicated via the LM3 can begin at the HE-SIG0 field 815. In other embodiments, the GI mode indicated via the LM3 can begin immediately after the repeated L-SIG 910, or a preset number of symbols after the repeated L-SIG 910 (for example, 1 symbol).

In the illustrated embodiment, the RL-SIG 910 includes total or partial repetition of the L-SIG field 805. For example, in an embodiment, the RL-SIG 910 can include a repetition of even tones of the L-SIG field 805. In an embodiment, the RL-SIG 910 can include a repetition of odd tones of the L-SIG field 805. In an embodiment, the RL-SIG 910 can include a repetition of every X tones of the L-SIG field 805, where X is the ratio of symbol duration for the L-SIG field 805 to symbol duration for the RL-SIG 910. In an embodiment, the HE-SIG0 815 is 4 μs, plus a guard interval (GI).

In various embodiments, the STA 106 can encode HE-SIG or other information in a polarity of repeated symbols. For example, to encode a 1, the STA 106 can multiply the repeated bits in the L-SIG field 805 by −1, to encode a 0, the STA 106 can multiply the repeated bits in the L-SIG field 805 by 1, and so on. In various embodiments, positive and negative repetition polarities can represent 0 and 1, respectively. In other embodiments, different encodings are possible. Note that information bits [0, 1] can become modulation bits [1, −1], in one embodiment. Thus, changing the polarity of a symbol can mean multiply it by ±1 instead of [0, 1].

Masking the RL-SIG

The RL-SIG field 910 can serve to provide early detection of HEW communications. For example, a STA 106 receiving the packet 900 can run the RL-SIG 910 through a time-domain or a frequency-domain auto-correlation. In some embodiments, an auto-correlation above a threshold can be interpreted as a HEW packet. Accordingly, HEW STAs 106 can continue to decode the packet 900, whereas non-HEW STAs can stop decoding the packet 900. Moreover, the RL-SIG field 910 can provide an additional opportunity for a receiver to decode the information in the L-SIG 805. When a packet is not intended for a particular STA, the STA can defer any communication attempts during the time period defined in the L-SIG 805 or RL-SIG 910, and can, to save power, enter a sleep mode during the packet period.

In various embodiments, the RL-SIG 910 is an exact repetition of the L-SIG 805. Such embodiments can experience errors in packet detection. For example, a time-aligned HEW packet can be transmitted in an adjacent band. In such embodiments, leakage from the adjacent HEW packet (which can have a periodicity equal to a duration of the L-SIG 805 plus a duration of the RL-SIG 910) can be strong enough to interfere with auto-correlation for the packet 900. As another example, narrow band spurious signals (for example, from nearby electronics) can degrade auto-correlation. Accordingly, in some embodiments, the RL-SIG 910 is not an exact repetition of the L-SIG 805.

In some embodiments, the polarity of the RL-SIG 910 does not carry additional information. Instead, the RL-SIG 910 can be masked with a sequence of ±1 in order to improve robustness of RL-SIG 910 detection. For example, a transmitter can multiply the RL-SIG 910 in the frequency domain by a sequence of ±1. For example, multiplication can occur at the field, symbol, or bit level. In various embodiments, the sequence can be predetermined, dynamically determined, retrieved from memory, negotiated, or otherwise known to both transmitter and receiver. A receiver can reverse the process, multiplying the received RL-SIG 910 by the sequence of ±1 prior to auto-correlation. Accordingly, the effect of sinusoidal interference on early detection can be reduced or eliminated.

Although masking of the RL-SIG 910 is described above, the methods can be applied to repetitions of any other fields discussed herein. For example, in some embodiments the HE-SIG0 815 and/or the HE-SIG1 820 can be repeated one or more times. Such repetitions can be similarly masked with a sequence of ±1.

Figure 10:
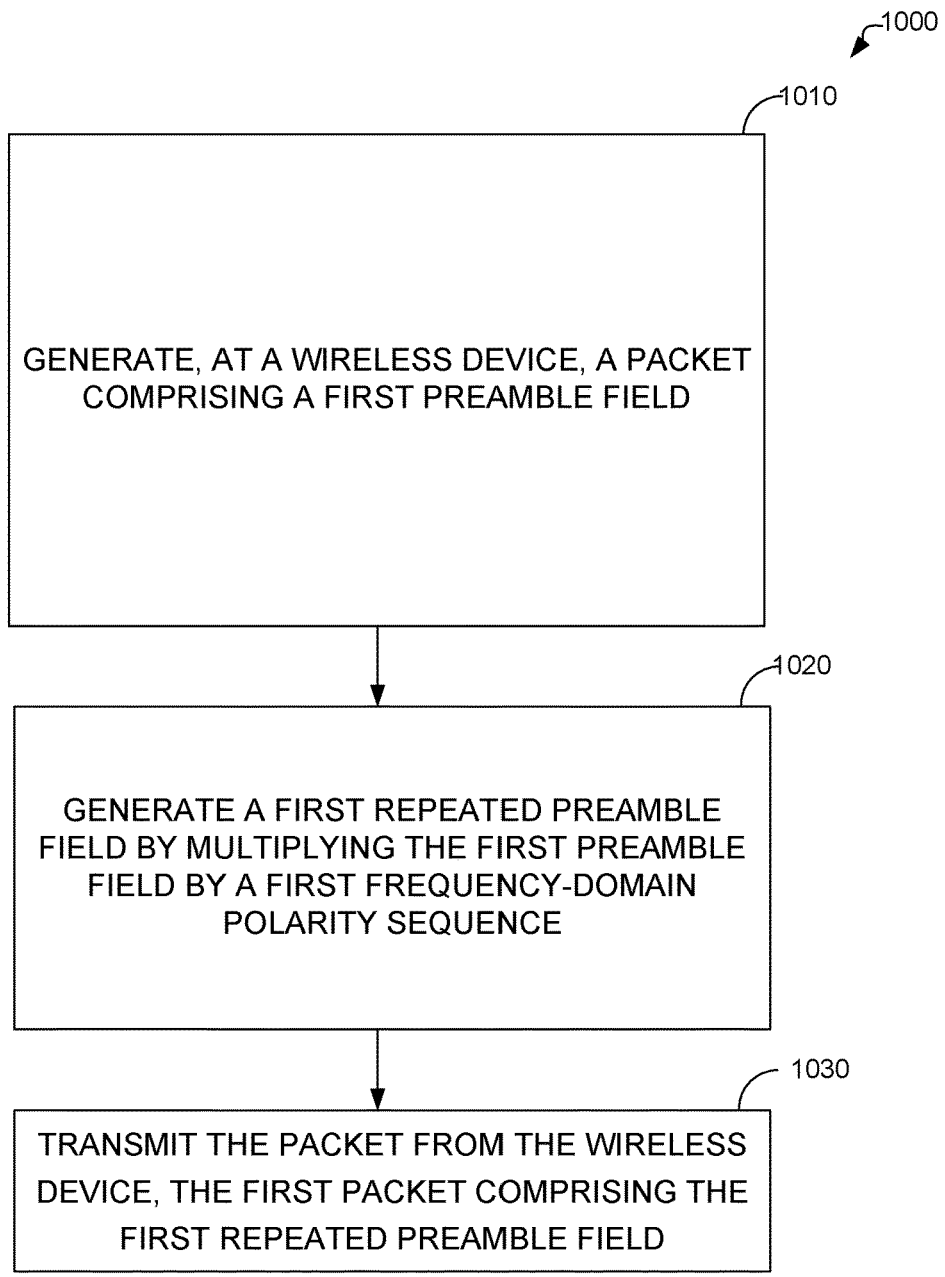
FIG. 10 shows a flowchart for an exemplary method of wireless communication that can be employed within the wireless communication system of FIG. 1.

FIG. 10 shows a flowchart 1000 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 800 and 900 discussed above with respect to FIGS. 8-9, a person having ordinary skill in the art will appreciate that the illustrated method can be implemented by another device described herein, or any other suitable device (such as the STA 106 and/or the AP 104). Although the illustrated method is described herein with reference to a particular order, in various embodiments, blocks herein can be performed in a different order, or omitted, and additional blocks can be added.

First, at block 1010, a wireless device generates a packet. The packet includes a first preamble field. For example, the AP 104 can generate the packet 900 of FIG. 9 as the packet. The packet 900 can include legacy preamble 805 as the first preamble field.

In various embodiments, the first preamble field can be decodable by a plurality of devices, and the packet can include a second preamble field decodable by only a subset of the plurality of devices. For example, the packet 900 can include HE preamble 810 as a second preamble. The second preamble field can include the HE-SIG0 field 815 or the HE-SIG1 820 as the second signal field.

In various embodiments, the first preamble field can include a length indication that is not a multiple of 3. For example, the L-SIG 805 can include a length indication such that the length, modulo 3, is equal to 1 or 2. In various embodiments, the length, modulo 3, can indicate one or more wireless communication parameters as discussed herein.

In various embodiments, the first preamble field can include a legacy signal (L-SIG) field, the legacy preamble being decodable by a plurality of devices, and the first repeated preamble field can include a repeated legacy signal (RL-SIG) field.

Next, at block 1020, the wireless device generates a first repeated preamble field by multiplying the first preamble field by a first frequency-domain polarity sequence. For example, the AP 104 can generate the RL-SIG 910 as the first repeated preamble field. In various embodiments, the first polarity sequence can include a predetermined sequence of −1 or +1.

Then, at block 1030, the wireless device transmits the packet. The packet includes the first preamble field and the first repeated preamble field. For example, the AP 104 can transmit the packet 900 to one or more STAs 106. The packet 900 can include the L-SIG 805 and the RL-SIG 910.

In various embodiments, the method can further include generating a second repeated preamble field by multiplying a second preamble field by a second frequency-domain polarity sequence. The packet can include a second repeated preamble field. For example, the second repeated preamble field can be the HE-SIG0 815 and/or the HE-SIG1 920, multiplied by a predetermined sequence of −1 or +1, and repeated in the packet 900. In various embodiments, the second frequency-domain polarity sequence can be the same as the first frequency-domain polarity sequence. In other embodiments, the second frequency-domain polarity sequence can be different from the first frequency-domain polarity sequence.

In an embodiment, the method includes generating, at a wireless device, a packet. The packet includes a legacy preamble including a legacy signal (L-SIG) field, the legacy preamble being decodable by a plurality of devices. The packet further includes a second preamble being decodable by only a subset of the plurality of devices. The second preamble may be defined for communications according to a newer protocol, such as an IEEE 802.11ax high efficiency protocol, that is different than the protocols used in certain legacy systems. The method further includes generating a repeated L-SIG field (RL-SIG) by masking the first preamble field with a sequence of ±1 in the frequency-domain. The method further includes transmitting the packet from the wireless device. The packet includes the L-SIG field and the RL-SIG field.

In an embodiment, the method shown in FIG. 10 can be implemented in a wireless device that can include a generating circuit and a transmitting circuit. Those skilled in the art will appreciate that a wireless device can have more components than the simplified wireless device described herein. The wireless device described herein includes components useful for describing some features of implementations within the scope of the claims.

The generating circuit can be configured to generate the packet. In some embodiments, the generating circuit can be configured to perform at least one of block 1010 or 1020 of FIG. 10. The generating circuit can include one or more of the processor 204 (FIG. 2), the memory 206 (FIG. 2), and the DSP 220 (FIG. 2). In some implementations, means for generating can include the generating circuit.

The transmitting circuit can be configured to transmit the packet. In some embodiments, the transmitting circuit can be configured to perform at least block 1030 of FIG. 10. The transmitting circuit can include one or more of the transmitter 210 (FIG. 2), the antenna 216 (FIG. 2), and the transceiver 214 (FIG. 2). In some implementations, means for transmitting can include the transmitting circuit.

Figure 11:
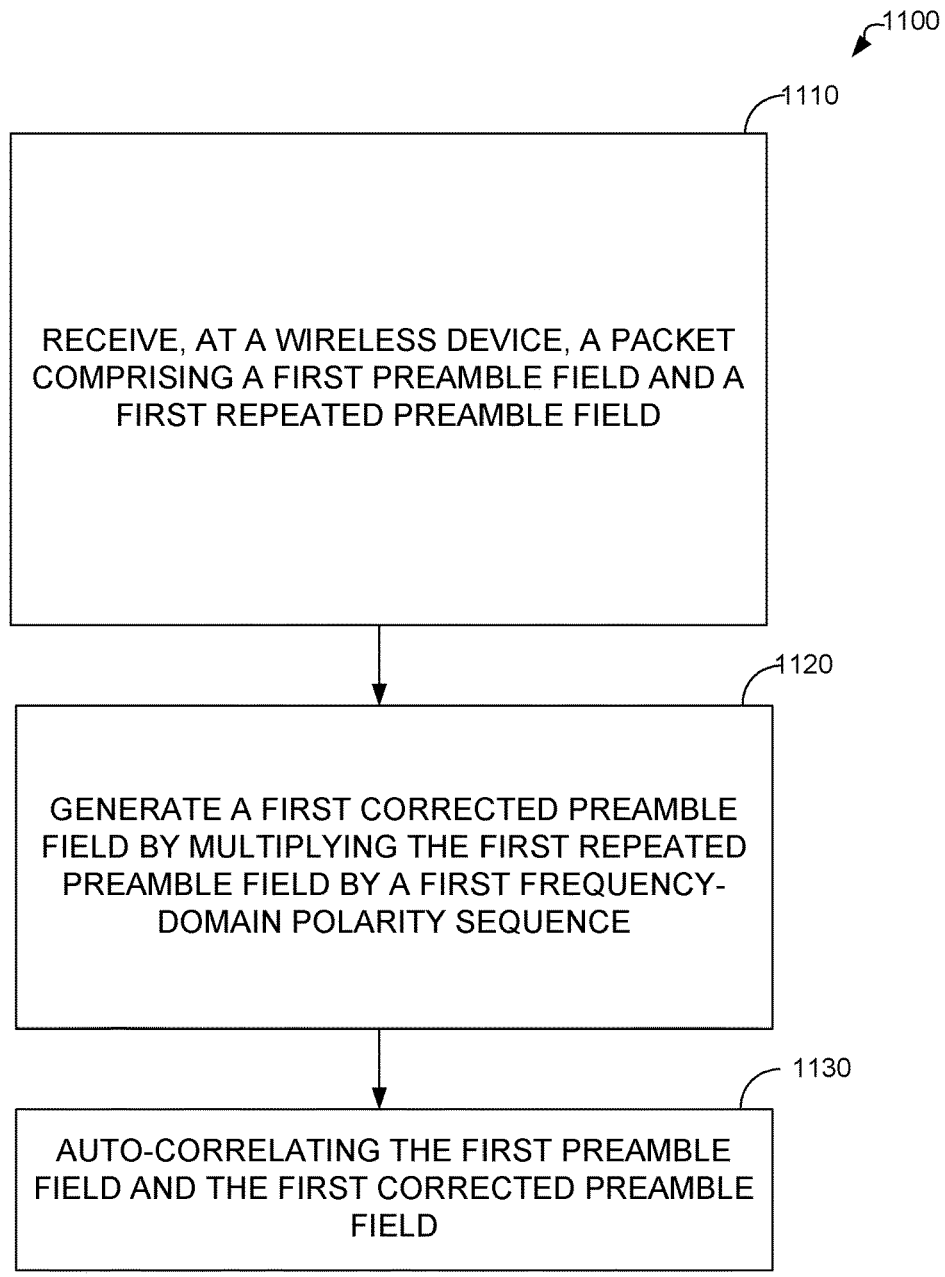
FIG. 11 shows another flowchart for an exemplary method of wireless communication that can be employed within the wireless communication system of FIG. 1.

FIG. 11 shows a flowchart 1100 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 800 and 900 discussed above with respect to FIGS. 8-9, a person having ordinary skill in the art will appreciate that the illustrated method can be implemented by another device described herein, or any other suitable device (such as the STA 106 and/or the AP 104). Although the illustrated method is described herein with reference to a particular order, in various embodiments, blocks herein can be performed in a different order, or omitted, and additional blocks can be added.

First, at block 1110, a wireless device receives a packet including a first preamble field and a first repeated preamble field. For example, the STA 106 can receive the packet 900 of FIG. 9 as the packet. The packet 900 can include legacy preamble 805 as the first preamble field and the RL-SIG 910 as the first repeated preamble field.

In various embodiments, the first preamble field can be decodable by a plurality of devices, and the packet can include a second preamble field decodable by only a subset of the plurality of devices. For example, the packet 900 can include the HE preamble 810 as a second preamble. The second preamble field can include the HE-SIG0 field 815 or the HE-SIG1 field 820.

In various embodiments, the first preamble field can include a length indication that is not a multiple of 3. For example, the L-SIG 805 can include a length indication such that the length, modulo 3, is equal to 1 or 2. In various embodiments, the length, modulo 3, can indicate one or more wireless communication parameters as discussed herein.

In various embodiments, the first preamble field can include a legacy signal (L-SIG) field, the legacy preamble being decodable by a plurality of devices, and the first repeated preamble field can include a repeated legacy signal (RL-SIG) field.

Next, at block 1120 the wireless device generates a first corrected preamble field by multiplying the first repeated preamble field by a first frequency-domain polarity sequence. For example, the STA 106 can multiply the RL-SIG 910 by an inverse of the predetermined sequence of −1 or +1 used by the AP 104 to generate the RL-SIG 910. Thus, the STA 106 can recover the original L-SIG 805 from the RL-SIG 910.

Then, at block 1130, the wireless device auto-correlates the first preamble field and the first corrected preamble field. For example, the STA 106 can auto-correlate the L-SIG 805 and the RL-SIG 910.

In various embodiments, the method can further include refraining from decoding the packet when a result of said auto-correlating is below a threshold. For example, the STA 106 can compare the result of auto-correlation to a threshold value. When the result is equal to or above the threshold, the STA 106 can determine that the packet 900 is a HEW packet and continue decoding the packet. When the result is below the threshold, the STA 106 can determine that the packet 900 is not a HEW packet and can stop decoding the packet. For example, the STA 106 can enter a low power mode.

In various embodiments, the packet can include a second repeated preamble field. The method can further include generating a second corrected preamble field by multiplying the second preamble field by a second frequency-domain polarity sequence. For example, the second repeated preamble field can be the HE-SIG0 815 and/or the HE-SIG1 920, multiplied at the AP 104 by a predetermined sequence of −1 or +1, which can be multiplied at the STA 106 by an inverse of the predetermined sequence of −1 or +1.

In an embodiment, the method includes receiving, at a wireless device, a packet. The packet includes a legacy preamble including a legacy signal (L-SIG) field, the legacy preamble being decodable by a plurality of devices. The packet further includes a repeated L-SIG field (RL-SIG). The packet further includes a second preamble being decodable by only a subset of the plurality of devices. The method further includes generating a corrected L-SIG field by masking the RL-SIG field with an inverse sequence of ±1 in the frequency-domain. The method further includes auto-correlating the L-SIG field and the corrected L-SIG field.

In an embodiment, the method shown in FIG. 11 can be implemented in a wireless device that can include a receiving circuit, a generating circuit, and an autocorrelating circuit. Those skilled in the art will appreciate that a wireless device can have more components than the simplified wireless device described herein. The wireless device described herein includes components useful for describing some features of implementations within the scope of the claims.

The receiving circuit can be configured to receive the packet. In some embodiments, the receiving circuit can be configured to perform at least block 1110 of FIG. 11. The receiving circuit can include one or more of the receiver 212 (FIG. 2), the antenna 216 (FIG. 2), and the transceiver 214 (FIG. 2). In some implementations, means for receiving can include the receiving circuit.

The generating circuit can be configured to generate the corrected preamble field. In some embodiments, the generating circuit can be configured to perform at least block 1120 of FIG. 11. The generating circuit can include one or more of the processor 204 (FIG. 2), the memory 206 (FIG. 2), and the DSP 220 (FIG. 2). In some implementations, means for generating can include the generating circuit.

The auto-correlating circuit can be configured to perform auto-correlation. In some embodiments, the setting circuit can be configured to perform at least block 1130 of FIG. 11. The auto-correlating circuit can include one or more of the processor 204 (FIG. 2), the memory 206 (FIG. 2), the DSP 220 (FIG. 2), and an auto-correlator. In some implementations, means for auto-correlating can include the auto-correlating circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above can also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it can be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
   receiving, at a first wireless device, a packet transmitted from a second wireless device;
   identifying a first preamble field in the packet;
   identifying a repeated preamble field in the packet, wherein the repeated preamble field is the first preamble field multiplied by a frequency-domain polarity sequence, wherein the first frequency-domain polarity sequence comprises a predetermined sequence of +1 and −1; and
   generating a corrected preamble field by multiplying the repeated preamble field by the frequency-domain polarity sequence at the first device to reverse the frequency-domain polarity sequence multiplication performed by the second device.

2. The method of claim 1, further comprising performing an auto-correlation between the first preamble field and the corrected preamble field.

3. The method of claim 2, further comprising:
   determining a result of the auto-correlation;
   comparing the result of the auto-correlation to a threshold; and
   refraining from decoding the packet in response to a determination that the result of the auto-correlating is below the threshold.

4. The method of claim 2, further comprising:
   determining a result of the auto-correlation;
   comparing the result of the auto-correlation to a threshold; and interpreting the packet as a first type of packet, instead of a second type of packet, in response to a determination that the result of the auto-correlation is above the threshold.

5. The method of claim 1, wherein the first preamble field is decodable by the plurality of devices, and the packet comprises a second preamble field decodable by only a subset of the plurality of devices.

6. The method of claim 1, further comprising:
identifying a length indication in the first preamble field; and
determining whether a value of the length indication is evenly divisible by three;
interpreting the packet as a first type of packet, instead of a second type of packet, in response to a determination that the value of the length indication is not evenly divisible by three.

7. The method of claim 1, wherein:
the first preamble field comprises a legacy signal (L-SIG) field; and
the first repeated preamble field comprises a repeated legacy signal (RL-SIG) field.

8. The method of claim 1, wherein a polarity of the repeated preamble field does not carry additional information.

9. An apparatus configured to perform wireless communication, comprising:
a receiver configured to receive a packet at a first wireless device transmitted from a second wireless device; and
a processor coupled with the receiver and configured to:
identify a first preamble field in the packet;
identify a repeated preamble field in the packet, wherein the repeated preamble field is the first preamble field multiplied by a frequency-domain polarity sequence, wherein the frequency-domain polarity sequence comprises a predetermined sequence of +1 and −1; and
generate a corrected preamble field by multiplying the repeated preamble field by the frequency-domain polarity sequence at the first device to reverse the frequency-domain polarity sequence multiplication performed by the second device.

10. The apparatus of claim 9, wherein the processor is further configured to perform an auto-correlation between the first preamble field and the corrected preamble field.

11. The apparatus of claim 10, wherein the processor is further configured to:
determine a result of the auto-correlation;
compare the result of the auto-correlation to a threshold; and
refrain from decoding the packet in response to a determination that the result of the auto-correlating is below the threshold.

12. The apparatus of claim 10, wherein the processor is further configured to:
determine a result of the auto-correlation;
compare the result of the auto-correlation to a threshold; and
interpret the packet as a first type of packet, instead of a second type of packet, in response to a determination that the result of the auto-correlation is above the threshold.

13. The apparatus of claim 9, wherein the first preamble field is decodable by the plurality of devices, and the packet comprises a second preamble field decodable by only a subset of the plurality of devices.

14. The apparatus of claim 9, wherein the processor is further configured to:
identify a length indication in the first preamble field; and
determine whether a value of the length indication is evenly divisible by three;
interpret the packet as a first type of packet, instead of a second type of packet, in response to a determination that the value of the length indication is not evenly divisible by three.

15. The apparatus of claim 9, wherein:
the first preamble field comprises a legacy signal (L-SIG) field; and
the first repeated preamble field comprises a repeated legacy signal (RL-SIG) field.

16. The apparatus of claim 9, wherein a polarity of the repeated preamble field does not carry additional information.

17. An apparatus configured to perform wireless communication, comprising:
means for receiving, at a first wireless device, a packet transmitted from a second wireless device;
means for identifying a first preamble field in the packet;
means for identifying a repeated preamble field in the packet, wherein the repeated preamble field is the first preamble field multiplied by a frequency-domain polarity sequence, wherein the frequency-domain polarity sequence comprises a predetermined sequence of +1 and −1; and
means for generating a corrected preamble field by multiplying the repeated preamble field by the frequency-domain polarity sequence at the first device to reverse the frequency-domain polarity sequence multiplication performed by the second device.

18. A non-transitory computer-readable medium comprising code that, when executed, causes an apparatus to:
receive, at a first wireless device, a packet transmitted from a second wireless device;
identify a first preamble field in the packet;
identify a repeated preamble field in the packet, wherein the repeated preamble field is the first preamble field multiplied by a frequency-domain polarity sequence, wherein the frequency-domain polarity sequence comprises a predetermined sequence of +1 and −1; and
generate a corrected preamble field by multiplying the repeated preamble field by the frequency-domain polarity sequence at the first device to reverse the frequency-domain polarity sequence multiplication performed by the second device.

* * * * *